United States Patent [19]

Brown

[11] 4,378,064
[45] Mar. 29, 1983

[54] THREE MASS ELECTROMAGNETIC FEEDER

[75] Inventor: William R. Brown, Blairsville, Pa.

[73] Assignee: FMC Corporation, Chicago, Ill.

[21] Appl. No.: 189,510

[22] Filed: Sep. 22, 1980

[51] Int. Cl.$^3$ ............................................. B65G 27/24
[52] U.S. Cl. ...................................................... 198/769
[58] Field of Search ............................ 209/366.5, 368; 198/766–770, 391, 756–757

[56] References Cited

U.S. PATENT DOCUMENTS

| | | | |
|---|---|---|---|
| 2,333,338 | 11/1943 | Rapp | 198/767 X |
| 2,353,492 | 7/1944 | O'Connor | 259/1 |
| 3,786,912 | 1/1974 | Taylor | 198/220 |
| 3,915,292 | 10/1975 | Brown | 198/220 |
| 3,964,600 | 6/1976 | Vensel | 198/220 |
| 4,007,825 | 2/1977 | Spurlin | 198/770 |
| 4,117,381 | 9/1978 | Pereny | 318/120 |

*Primary Examiner*—Stephen G. Kunin
*Assistant Examiner*—Douglas D. Watts
*Attorney, Agent, or Firm*—L. B. Guernsey; W. W. Ritt, Jr.; R. B. Megley

[57] ABSTRACT

A vibratory feeder employs a three mass system instead of the conventional two mass system to reduce the amount of power to operate the feeder. A base assembly having an armature formed thereon is positioned adjacent an electromagnet. The electromagnet is mounted to the base assembly by a leaf spring system, and a trough assembly is connected to the base assembly by a plurality of leaf springs. The electromagnet forms one mass of the three mass system; the armature and base assembly form a second mass; and the trough assembly forms a third mass. The phase of vibration of the armature relative to the vibration of the electromagnet can be regulated by adjusting the mass of the trough assembly and/or by adjusting the spring rate of the trough springs. The correct choice of mass and of spring rate causes the armature and the electromagnet to vibrate in phase with each other and reduces the mean length of air gap required between the armature and the electromagnet. Since the power required to drive the feeder is directly proportional to the length of the air gap, the present three mass system can be considerably cheaper to operate than the prior art system.

8 Claims, 11 Drawing Figures

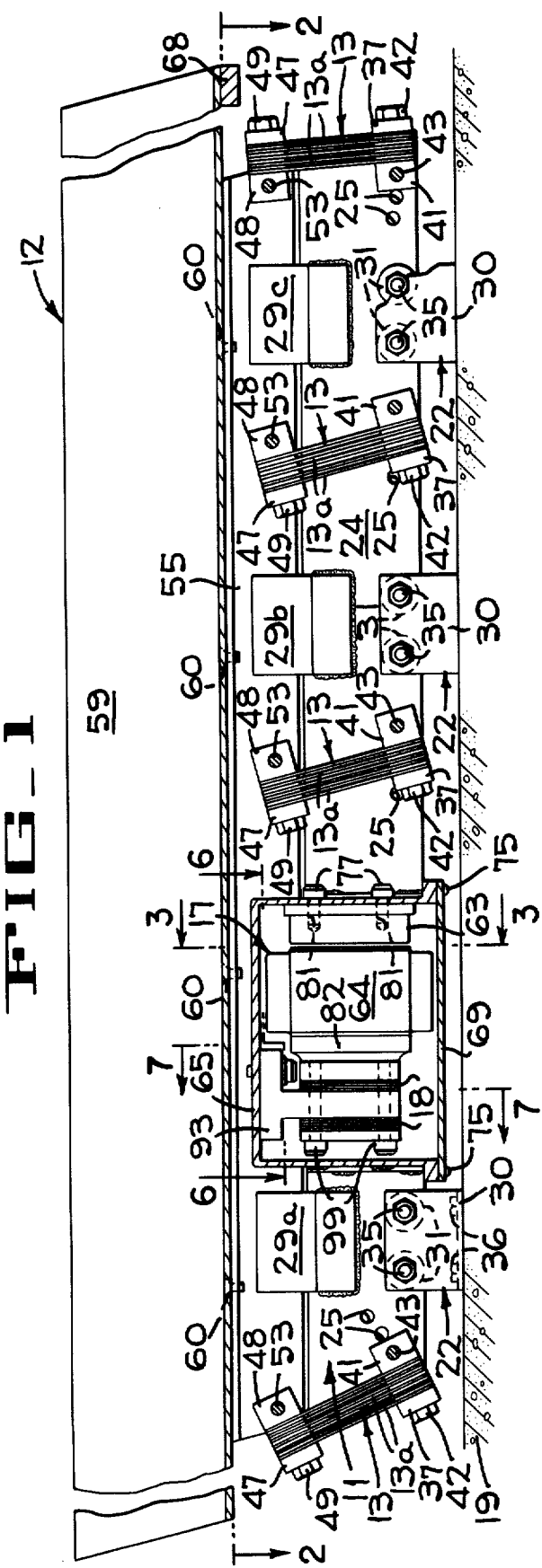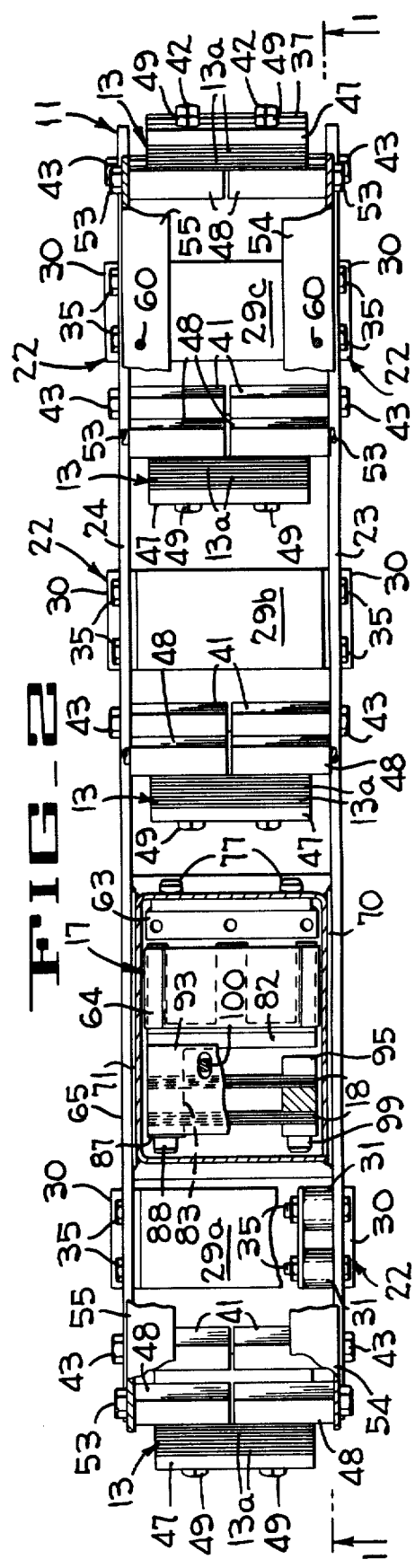

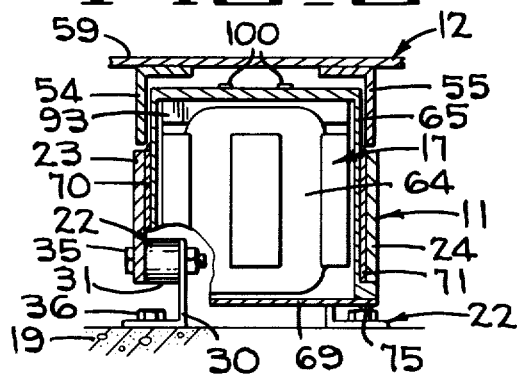
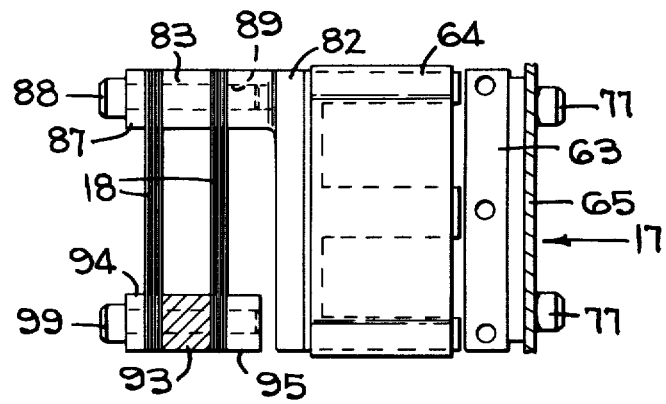
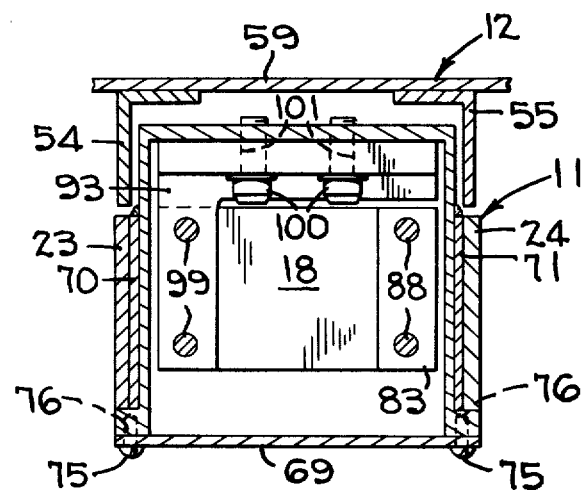

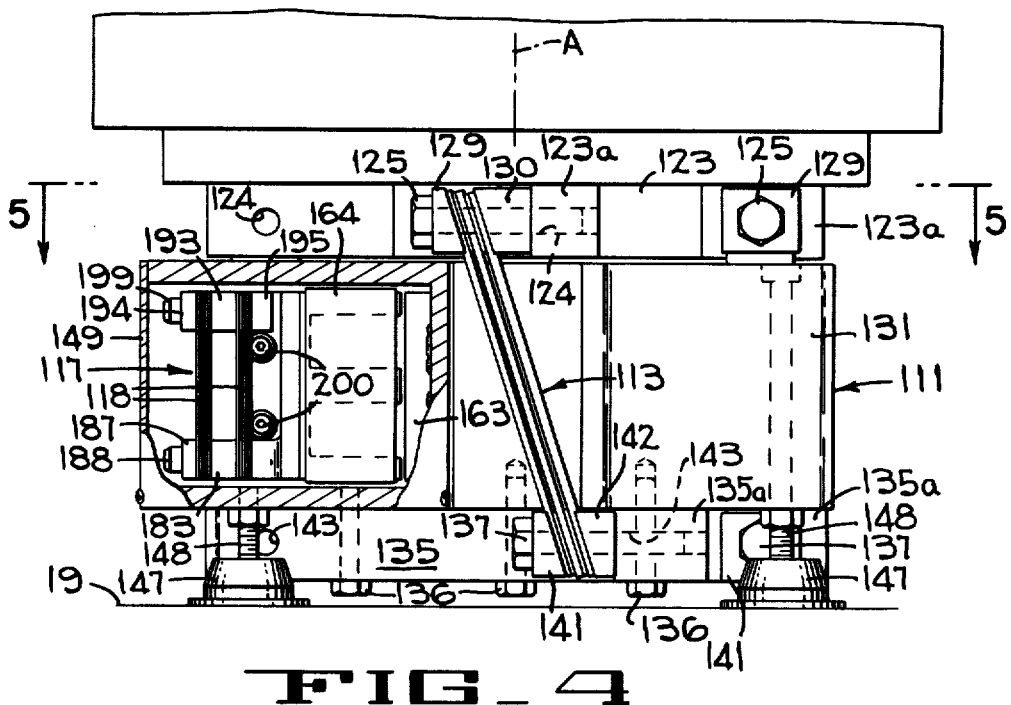
FIG_4
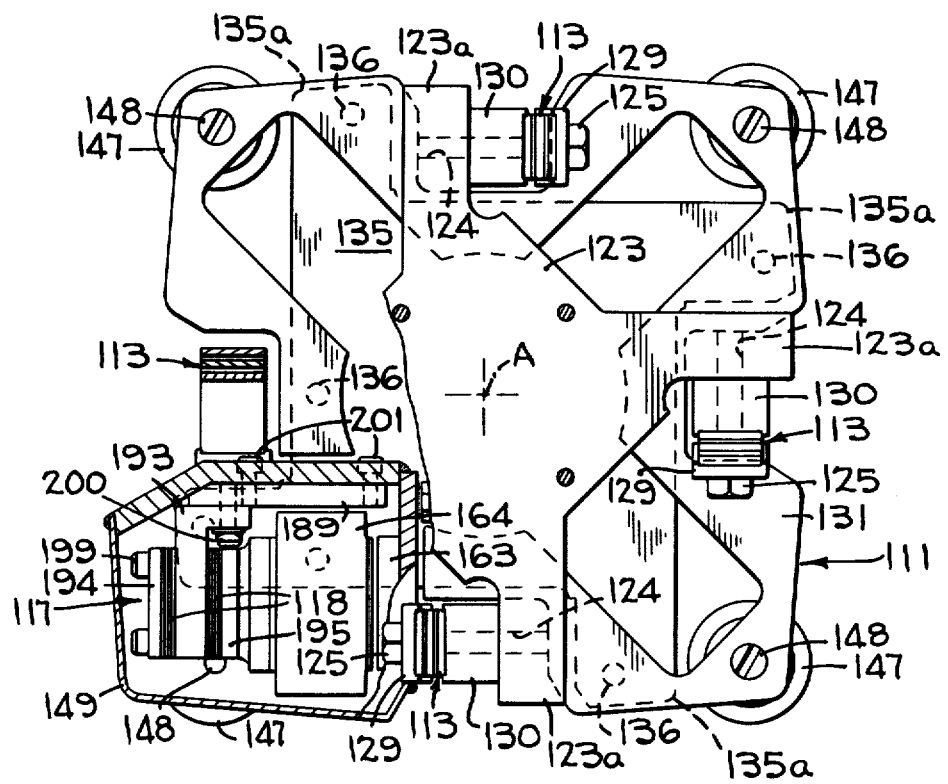
FIG_5

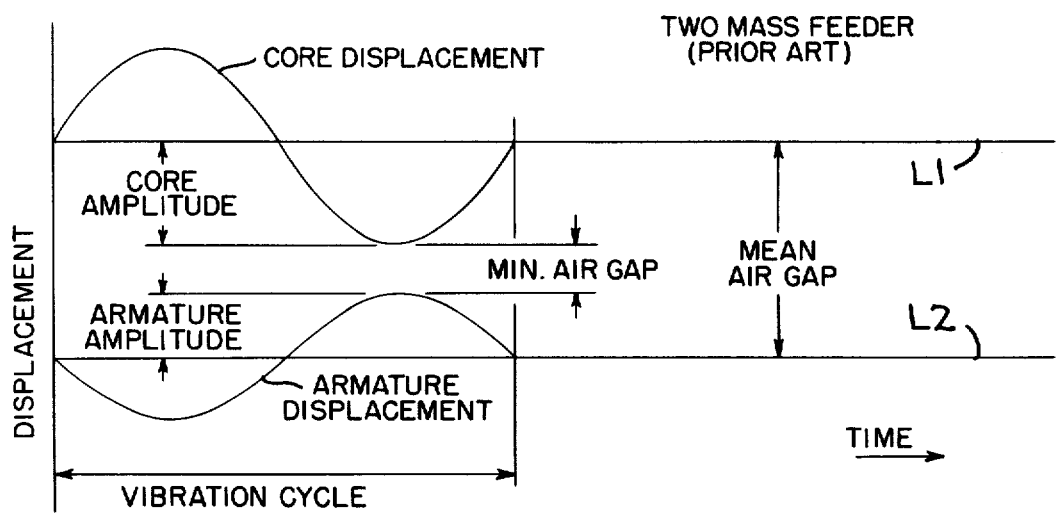
FIG_8
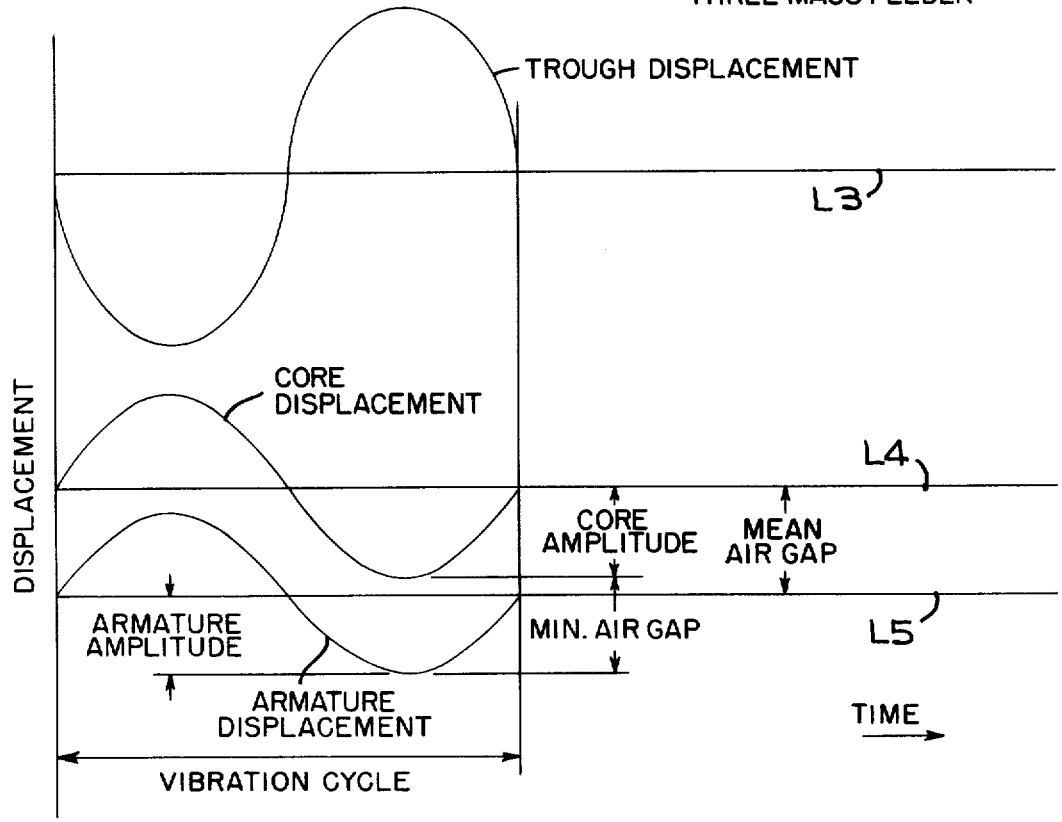
FIG_9

FIG_10
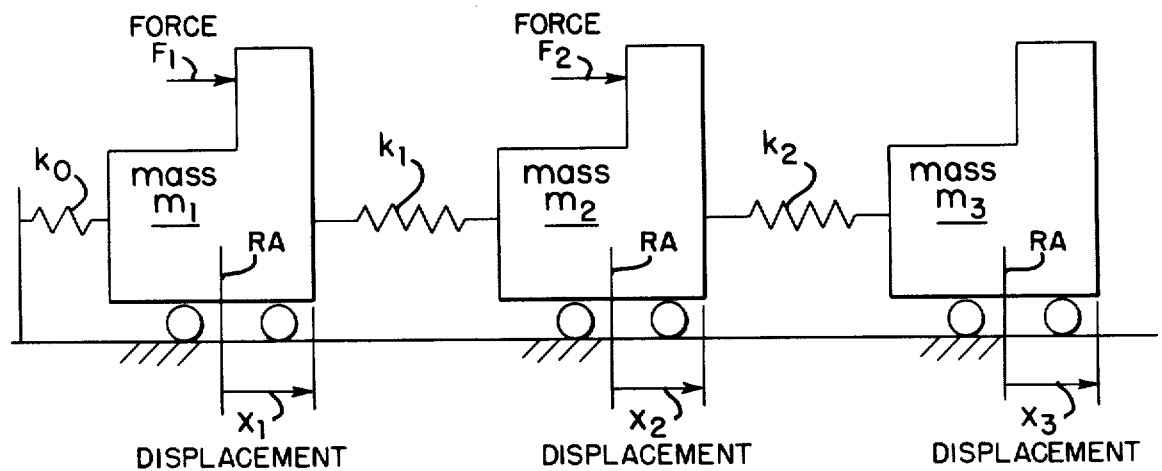
FIG_11
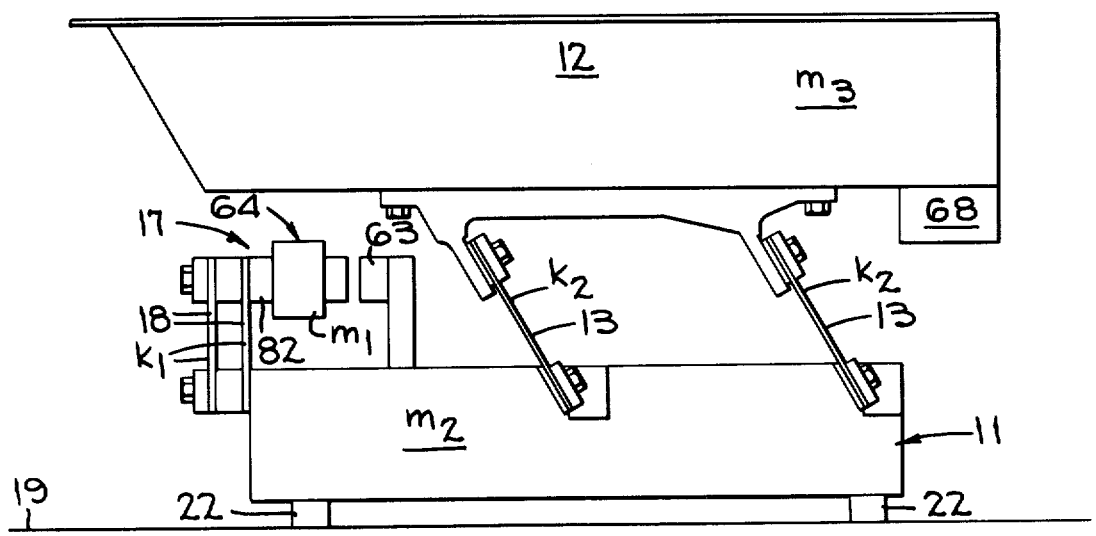

THREE MASS ELECTROMAGNETIC FEEDER

BACKGROUND OF THE INVENTION

1. Field of the Invention

This invention relates to vibratory feeders for conveyors and more particularly to a vibratory feeder that requires less power to operate than prior art feeders.

2. Description of the Prior Art

Vibratory parts feeders are commonly used to move mechanical parts from a feeder bowl or to move material or parts along an elongated trough from a supply point to a discharge point. Such feeders frequently include a base mass that is supported upon the floor or upon a feeder stand by vibration isolators which serve to isolate the feeder from the floor. A frame mass is mounted above the base mass by a plurality of inclined leaf spring sets that enable the frame mass to oscillate in response to an exciter motor. Such exciter motors are commonly of an electromagnetic type that includes a field core and a coil mounted on the base mass and an armature mounted on the underside of the frame mass with an air gap between the armature and the field coil. When an alternating current is supplied to the coil, the armature and frame mass are alternately drawn toward the coil and released, thereby flexing the leaf spring sets. Movement of the frame is always 180 degrees out of phase with respect to movement of the base. This causes the frame mass to oscillate at a predetermined frequency that is determined by the frequency of the current supplied to the coil. Since such feeders include only a base mass and a frame mass, they can be referred to as a two mass vibratory feeder system. One such vibratory parts feeder is shown in the U.S. Pat. No. 3,258,111. When such a two mass system is used, the air gap between the armature and the field core must be slightly larger than the distance that the armature and the field coil move. The power required by the electromagnetic coil is directly proportional to the length of this gap and for large movements of the frame mass and of the attached trough, a considerable amount of power is required.

It is known to provide three mass vibratory systems, such as shown in U.S. Pat. Nos. 2,353,492 issued to O'Connor; 3,786,912 issued to Taylor; 4,117,381 issued to Pereny; and 4,007,825 issued to Spurlin et al.

SUMMARY OF THE INVENTION

In accordance with the present invention power required to operate a vibratory feeder is greatly reduced by using a three mass system wherein an armature and a field core vibrate in phase with each other, i.e., move in the same direction instead of moving in opposite directions when they vibrate. In the illustrated embodiment of the invention a resiliently mounted base member includes an armature on one portion of the base member. An electromagnetic driver is spring mounted to the base member with the electromagnetic driver mounted adjacent the armature. A trough assembly or other working member is connected to the base member by spring support means. The drive coil and its core form one mass of the three mass drive system; the armature and base member form a second mass; and the trough assembly forms a third mass.

The phase of vibration of the armature relative to the vibration of the drive coil can be regulated by adjusting the spring rate of the spring support means. When the armature and the drive coil vibrate in phase with each other the mean length of the air gap between the armature and the drive coil can be considerably reduced. Since the power required to operate the drive coil is directly proportional to the length of the air gap a reduction in the air gap results in a reduction in the power required to operate the vibrating trough assembly.

BRIEF DESCRIPTION OF THE DRAWINGS

FIG. 1 is a vertical longitudinal section generally taken on the line 1—1 of FIG. 2, of one embodiment of the vibratory feeder of the present invention.

FIG. 2 is a horizontal section, taken on the line 2—2 of FIG. 1, with portions broken away to show underlying structure.

FIG. 3 is a transverse section, taken on the line 3—3 of FIG. 1, with portions broken away.

FIG. 4 is a side elevation of another embodiment of a vibratory feeder of the present invention, partly in section and with portions broken away.

FIG. 5 is a horizontal section, taken on the line 5—5 of FIG. 4 with portions being broken away.

FIG. 6 is an enlarged section, taken on line 6—6 of FIG. 1, showing details of the electromagnet and the armature.

FIG. 7 is an enlarged vertical section taken along the line 7—7 of FIG. 1.

FIG. 8 is a schematic illustration of the amplitude and phase of the vibrations of the armature and electromagnet in a two mass vibratory feeder system.

FIG. 9 is a schematic illustration of the vibration of the armature and electromagnet in a three mass vibratory feeder system of the present invention.

FIG. 10 is a schematic illustration of the masses, forces and vibratory displacements in a three mass vibratory system.

FIG. 11 is a schematic illustration of the physical arrangement of elements of the three mass vibratory system of FIG. 10.

DESCRIPTION OF THE PREFERRED EMBODIMENT

A three mass electromagnet trough feeder in accordance with the present invention comprises an elongated base assembly 11 (FIGS. 1, 2, 11) connected to a trough assembly 12 by a plurality of leaf springs 13, and an electromagnetic driver 17 connected to the base assembly 11 by a plurality of resilient means such as springs 18. The base assembly 11 is mounted to a foundation 19 by means of a plurality of vibration isolating means 22.

The base assembly 11 includes a pair of side plates 23, 24 (FIGS. 1, 2) each having a plurality of holes 25 for mounting the leaf springs to a desired inclination between the base assembly 11 and the trough assembly 12. A plurality of weight blocks 29a-29c (FIGS. 1-3) extending transversely between the side plates are welded or otherwise connected to the side plates 23, 24. The side plates 23, 24 are connected to the foundation 19 by the vibration isolating means 22 (FIGS. 2, 3) each of which includes a mounting angle 30, a pair of vibration isolators 31, a pair of cap screws 35 and a pair of stud bolts 36. The vibration isolators are generally cylindrical in shape and are made of an elastomeric material such as rubber, that deflects under loading. Each isolator includes an internally threaded sleeve (not shown) coaxially embedded within the isolator at the end opposite from the stud bolt, and the stud bolt is embedded within the other end of the isolator.

The leaf springs 13 project upwardly from opposite sides of the base assembly as shown in FIG. 1 with each of the leaf springs including a set of leaves 13a. At both sides of the feeder, the lower portion of each set of leaves 13a is held in place between a clamp 37 and a mounting bracket 41 by transversely extending cap screws 42. The mounting brackets 41 are fastened to the side plates 23, 24 by cap screws 43 which screw fit into one of the openings 25 in the side plates. At both sides of the feeder, the upper portions of the leaves are held in place between clamps 47 and mounting brackets 48 by transversely extending cap screws 49.

The mounting brackets 48 are fastened by cap screws 53 (FIG. 1) to a pair of trough mounting brackets 54 and 55 (FIGS. 1, 3, 7), that are a part of the trough assembly 12. The mounting brackets 48 (FIG. 1) can pivot about the cap screws 53 for adjusting the leaf springs 13 to a desired inclination, where the selectively positioning mounting brackets 41 are aligned with a desired hole 25. The trough brackets 54, 55 (FIGS. 3, 7) each have a leg extending vertically and substantially parallel to the side plates 23, 24 and another leg extending horizontally and parallel to the bottom of a trough 59 which is part of the trough assembly 12. The trough 59 (FIG. 1) is fastened to the horizontally extending legs of the trough mounting brackets by flatheaded screws 60 which are countersunk into the bottom of the trough 59. The trough 59 could also be welded or otherwise fastened to the trough mounting brackets.

The electromagnetic driver 17 (FIGS. 1, 2, 11) includes an armature 63 mounted on the base assembly 11 and an electromagnet 64 connected to the base assembly 11 by electromagnetic springs 18. The electromagnet 64 and the armature 63 (FIGS. 1-3, 6, 7) are enclosed in a protective box 65 having a removable cover 69 (FIGS. 1, 7). The box 65 (FIGS. 2, 3, 7) is secured to the side plates 23, 24 by a pair of plates 70, 71, which are mounted between and welded to the plates 23, 24 and welded to the vertical sides of the box 65. The cover 69 is secured to the lower side of the box 65 by a plurality of screws 75 (FIGS. 1, 3, 7) which are threaded into holes 76 (FIG. 7) in the lower edge of the box 65. The armature 63 (FIGS. 1, 2, 6) is secured to one end of the box 65 by a plurality of capscrews 77 which extend through holes in the end of the box into threaded holes 81 in the armature 63 as shown in FIG. 1. An electromagnetic core 82 of the electromagnet 64 is secured to one end of the springs 18 by a spacer 83 (FIGS. 1, 2, 6, 11), a clamp 87 and a pair of capscrews 88 each of which are mounted in a threaded hole 89 (FIG. 6) in the core 82. The other end of each of the springs 18 is connected to a core mounting bracket 93 by a pair of clamps 94, 95 and by a pair of capscrews 99. The mounting bracket 93 is secured to the top of the box 65 by a pair of capscrews 100 mounted in a pair of threaded holes 101 as best seen in FIG. 7.

The operation of the three mass feeders of FIGS. 1-3, 6 and 7 can best be seen by referring to FIGS. 8-11.

Refer to FIG. 10 where the following symbols are used:

RA—reference axes fixed in space located at leading edge of masses when masses in an initial position
$m_1$—electromagnetic exciter mass
$m_2$—base assembly mass
$m_3$—trough assembly or other working mass
$k_o$—isolator spring rate
$k_1$—exciter spring rate
$k_2$—feeder spring rate
$F_1$—electromagnetic force on $m_1$
$F_2$—electromagnetic force on $m_2$
$X_1$—displacement of mass $m_1$
$X_2$—displacement of mass $m_2$
$X_3$—displacement of mass $m_3$ FIG. 10 is an elementary physical model having characteristics typical of any three mass system.

In a simplified form of the present invention shown in FIG. 11, a 60 hertz sine wave of voltage or a 60 hertz rectified wave is applied to the electromagnetic driver 17 to provide power for operating the feeder, although other frequencies can be used to operate the feeder.

General equations applicable to the model of FIG. 10, the device of FIG. 11, or any typical three mass system, can be expressed as set forth in the following equations (8.20), (8.21) and (8.23).

A discussion of these equations can be seen starting on page 312 of the textbook, "Mechanical Vibrations", second edition by Austin H. Church, John Wiley & Sons, Inc., New York, New York 1963.

$$-m_1\omega^2 X_1 + (k_o + j\omega c_o)(X_1 - X_o) + j\omega c_1^1 X_1 - \quad (8.20)$$
$$(k_1 + j\omega c_1)(X_2 - X_1) = F_1$$

$$-m_2\omega^2 X_2 + (k_1 + j\omega c_1)(X_2 - X_1) + j\omega c_2^1 X_2 - \quad (8.21)$$
$$(k_2 + j\omega c_2)(X_3 - X_2) = F_2$$

$$-m_n\omega^2 X_n + (k_{n-1} + j\omega c_{n-1})(X_n - X_{n-1}) + j\omega c_n^1 X_n - \quad (8.23)$$
$$(K_n + j\omega c_n)(X_{n+1} - X_n) = F_n$$

Neglecting the effects of the isolation system: $k_o=0$ Neglecting all damping in the system all imaginary terms are equal to zero.

Since there are three masses: $n=3$ and $k_n=0$; $F_n=0$ The three equations reduce to the following:

$$-m_1\omega^2 X_1 - k_1(X_2 - X_1) = F_1 \quad (8.20)$$

$$-m_2\omega^2 X_2 + k_1(X_2 - X_1) - k_2(X_3 - X_2) = F_2 \quad (8.21)$$

$$-m_3\omega^2 X_3 + K_2(X_3 - X_2) = 0 \quad (8.23)$$

The electromagnetic force acting on the base is equal and opposite to the electromagnetic force on the electromagnetic exciter and therefore $F_2 = -F_1$.

By transposing equation 8.20, an equation for the amplitude $X_1$ of the electromagnetic exciter is obtained as follows:

$$X_1(k_1 - m_1\omega^2) = F_1 + k_1 X_2 \quad (8.20)$$

$$X_1 = \frac{\frac{F_1}{k_1} + X_2}{(1 - \beta_1^2)} \text{ where } \beta_1^2 = \frac{m_1\omega^2}{k_1}$$

By transposing equation 8.23, an equation for the amplitude $X_3$ of the trough assembly is obtained as follows:

$$X_3(k_2 - m_3\omega^2) = k_2 X_2 \quad (8.23)$$

$$X_3 = \frac{X_2}{(1 - \beta_3^2)} \text{ where } \beta_3^2 = \frac{m_3\omega^2}{k_2} \quad (8.23a)$$

If the value of $\beta_3$ is greater than one ($\beta_3>1$) then $(1-\beta_3^2)$ has a negative value and the amplitude of vibration $X_2$ of the base will be out of phase with the amplitude $X_3$ of the trough assembly. Conversely, if the value of $\beta_3$ is less than one ($\beta_3<1$) then $(1-\beta_3^2)$ has a positive value and the amplitude $X_2$ of the base will be in phase with the amplitude $X_3$ of the trough assembly. Substituting the derived relationships for the amplitude $X_1$ and $X_3$ in equation 8.21, an equation for the electromagnetic force $F_1$ acting on the exciter is obtained as follows:

$$-m_2\omega^2 X_2 + k_1\left[X_2 - \frac{\frac{F_2}{k_1}+X_2}{(1-\beta_1^2)}\right] -$$

$$k_2\left[\frac{X_2}{(1-\beta_3^2)} - X_2\right] = -F_1$$

By combining terms:

$$F_1 =$$

$$-X_2\left(\frac{1-\beta_1^2}{\beta_1^2}\right)\left[m_2\omega^2 + k_1\left(\frac{\beta_1^2}{1-\beta_1^2}\right) + k_2\left(\frac{\beta_3^2}{1-\beta_3^2}\right)\right]$$

Substituting this equation for $F_1$ into equation 8.20 a relationship is established between the amplitude $X_1$ of the exciter and amplitude $X_2$ of the base.

$$X_1(1-\beta_1^2) = X_2 + \frac{F_1}{k_1}$$

$$X_1(1-\beta_1^2) = X_2 -$$

$$\frac{X_2}{k_1}\left(\frac{1-\beta_1^2}{\beta_1^2}\right)\left[m_2\omega^2 + k_1\left(\frac{\beta_1^2}{1-\beta_1^2}\right) + k_2\left(\frac{\beta_3^2}{1-\beta_3^2}\right)\right]$$

$$X_1 = -\frac{X_2}{m_1}\left[m_2 + \frac{m_3}{(1-\beta_3^2)}\right]$$

If the value of $\beta_3$ is greater than one ($\beta_3>1$) and the absolute value of the ratio $m_3/(1-\beta_3^2)$ is greater than $m_2$ then the term $[m_2+m_3/(1-\beta_3^2)]$ is negative and the amplitude $X_1$ of the exciter will be in phase with the amplitude $X_2$ of the base.

As can be seen from FIG. 11, when the base assembly and the exciter are in phase, the armature 63 (with mass $m_2$) and the electromagnet 64 (with mass $m_1$) move in the same direction at each instant of time. When this occurs, the air gap between the armature and the core of the electromagnet can be small as illustrated in FIG. 9 because the minimum value of the air gap and the mean value of the air gap are very close to being the same. The graph of FIG. 9 shows the amount of armature displacement about a "rest" position L5, the amount of electromagnetic core displacement about a "rest" position L4 and the amount of trough displacement about a "rest" position L3. Each of the displacements are plotted against a change in time. The instantaneous length of the air gap is equal to the sum of the displacement of the armature, the displacement of the electromagnet, and the mean length of the air gap. When the base assembly and the exciter are in phase and have substantially the same amplitude of vibration, the instantaneous length of the air gap is essentially constant and equal to the minimum length of the air gap. This is a substantial improvement over the prior art two mass system where the trough is connected to either the armature or to the electromagnet, and where the armature and the electromagnet move 180 degrees out of phase with each other, as shown in FIG. 8. The graph of FIG. 8 shows the amount of armature displacement about a rest position L2 and the amount of electromagnetic core displacement about a rest position L1. The minimum air gap is slightly less than the minimum air gap (FIG. 9) of the three mass system, but the mean air gap is much larger. Since the power required to operate the trough increases as the mean air gap increases, the power needed to operate the electromagnet in the two mass system is much larger than the power required in the three mass system of the present invention.

As seen in the above equation 8.23a the phase of the electromagnetic exciter relative to the base assembly in a three mass system can be changed by varying either the mass $m_3$ (the mass of the trough assembly) or by varying the value of the spring rate $k_2$. The spring rate can be changed by changing the number of leaves in the leaf springs 13 (FIG. 11) and the mass $m_3$ can be changed by changing the value of a weight 68 (FIGS. 1, 11). If the frequency ratio $\beta_3$ is greater than one and the absolute value of the ratio $m_3/(1-\beta_3^2)$ is less than $m_2$ than the term $[m_2+m_3/(1-\beta_3^2)]$ is positive and the amplitude $X_1$ of the exciter will be out of phase with the amplitude $X_2$ of the base.

The isolation springs which support the feeder and attach to the base were neglected. Their influence on the performance of the feeder is minimized by reducing the transmissibility and spring rate of the isolation springs.

Another embodiment of the three mass electromagnetic feeder of the present invention as disclosed in FIGS. 4 and 5 includes a base assembly 111, a bowl assembly 112 and an electromagnetic driver 117. The base assembly 111 is connected to the bowl assembly 112 by a plurality of circumferentially spaced leaf springs 113. The bowl assembly 112 includes a generally circular bowl 119 welded or otherwise connected to a top cross arm 123. The top cross arm includes a plurality of radially extending arms 123a each having a threaded hole 124 therein. The upper end of each of the leaf springs 113 is secured to a corresponding one of the radial arms 123a by a cap screw 125 extending through a clamp 129, the upper end of a spring 113 and a clamping block 130 into the threaded hole 124.

The base assembly 111 includes a base member 131 and a bottom cross member 135 secured together by a plurality of cap screws 136. The lower end of each of the leaf springs 113 is connected to a radially extending arm 135a of the bottom cross member by a cap screw 137, a clamp 141 and a clamping block 142. The cap screw 137 extends into a threaded hole (FIG. 4) in the arm 135a of the bottom cross member. The base assembly is mounted on the foundation 19 by a plurality of vibration isolators 147 which are secured to the base assembly 111 by a plurality of bolts 148.

A protective box 149 (FIGS. 4, 5) for housing the electromagnetic driver 117 is welded or otherwise connected to base assembly 111. The electromagnetic driver 117 is of the same type as the electromagnetic driver 17 shown in FIGS. 1-3, 6 and 7. An armature 163 is welded or otherwise connected to one end of the box 149 and an electromagnet 164 is positioned adjacent and spaced from the armature 163. The electromagnet 164 is connected to the box 149 by a pair of springs 118, with one end of each of the springs connected to the electromagnet 164 by a spacer 183, a clamp 187 and a cap screw 188. The other end of each of the springs 118 is connected to a core mounting bracket 193 by a pair of clamps 194, 195 and a cap screw 199. The mounting bracket 193 is secured to a mounting plate 189 by cap screws 200 and the mounting plate 189 is secured to a side wall of the box 149 by a plurality of cap screws 201.

Electrical A.C. power applied to the electromagnet causes the armature 163 and the base assembly 111 to oscillate about a vertical axis A (FIG. 5) and the leaf springs 113 couple energy from the base assembly to the bowl assembly 112 to cause the bowl assembly to oscillate about the same axis A.

The three mass electromagnetic feeders of the present invention each employ an armature and an electromagnet which vibrate in phase with each other to reduce the length of the air gap between the armature and the electromagnet and thus reduce the power required to operate the feeders.

Although the best mode contemplated for carrying out the present invention has been herein shown and described, it will be apparent that modification and variation may be made without departing from what is regarded to be the subject matter of the invention.

What is claimed is:

1. A three mass electromagnetic feeder for mounting on a supporting surface and for receiving material to be conveyed, said feeder comprising:
   a feeder base assembly being one of said three masses;
   a first resilient means for resiliently mounting said base assembly to said supporting surface;
   a feeder trough assembly being one of said three masses;
   a second resilient means for resiliently mounting said trough assembly to said base assembly;
   a vibratory mechanism having two vibratory parts including an electromagnetic driver and an armature, said electromagnetic driver being one of said three masses, said two vibratory parts being relatively shiftable cyclically when energized;
   means for securing said armature to said base assembly to induce vibrations in said base assembly when said electromagnetic driver is energized and to induce vibrations from said base assembly through said second resilient means to said trough assembly; and
   means for resiliently coupling said electromagnetic driver of said vibratory mechanism to said base assembly for vibration in phase with said armature of said vibratory mechanism on the base assembly.

2. An electromagnetic feeder as defined in claim 1 including means for adjusting the phase of vibration of said one of said vibratory parts relative to the vibration of the other of said vibratory parts.

3. An electromagnetic feeder as defined in claim 2 wherein said adjusting means includes means for adjusting the spring rate of said resilient means between said trough assembly and said base assembly.

4. An electromagnetic feeder as defined in claim 1 wherein said resilient means between said base assembly and said supporting surface includes means for isolating the movement of said base assembly from said supporting surface.

5. A three mass electromagnetic feeder as defined in claim 1 including means for adjusting said second resilient means to obtain a minimum length of gap between said electromagnetic driver and said armature by causing said armature and said electromagnetic driver to vibrate in phase with each other.

6. A three mass electromagnetic feeder as defined in claim 1 wherein the mass of said feeder trough assembly may be adjusted to regulate the vibration phase of said armature relative to the vibration of said electromagnetic driver.

7. A three mass electromagnetic feeder for mounting on a supporting surface and for receiving materials to be conveyed by said feeder, said feeder comprising:
   a base member having an armature fixed thereto;
   isolating support means connected between said base member and said supporting surface to isolate vibrations of said base member from said supporting surface;
   an electromagnetic driver;
   driver spring means connected between said base member and said electromagnetic driver for mounting said electromagnetic driver adjacent to and spaced from said armature to induce vibrations in said base member when said electromagnetic driver is energized;
   a trough assembly;
   spring means for supporting said trough assembly from said base member and for coupling vibrations from said base member to said trough assembly; and
   means for adjusting the phase of vibrations of said armature relative to the vibration of said electromagnetic driver.

8. A three mass electromagnetic feeder as defined in claim 7 wherein said means for adjusting the phase of vibrations includes means for adjusting the spring rate of said spring means causing said armature and said electromagnetic driver to vibrate in phase with each other and thereby reducing the length of the gap required between said armature and said driver.

* * * * *